US012021331B2

(12) United States Patent
Wille

(10) Patent No.: US 12,021,331 B2
(45) Date of Patent: Jun. 25, 2024

(54) PLUG SYSTEM COMPRISING A PLUG CONNECTOR PART AND A PLUG DEVICE

(71) Applicant: Phoenix Contact GmbH & Co. KG, Blomberg (DE)

(72) Inventor: Peter Wille, Paderborn (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 386 days.

(21) Appl. No.: 17/435,446

(22) PCT Filed: Mar. 5, 2020

(86) PCT No.: PCT/EP2020/055844
§ 371 (c)(1),
(2) Date: Sep. 1, 2021

(87) PCT Pub. No.: WO2020/182608
PCT Pub. Date: Sep. 17, 2020

(65) Prior Publication Data

US 2022/0059968 A1 Feb. 24, 2022

(30) Foreign Application Priority Data

Mar. 12, 2019 (DE) .................... 10 2019 106 254.3

(51) Int. Cl.
*H01R 13/631* (2006.01)
*H01R 4/48* (2006.01)
*H01R 24/68* (2011.01)

(52) U.S. Cl.
CPC ....... *H01R 13/631* (2013.01); *H01R 4/48185* (2023.08); *H01R 24/68* (2013.01)

(58) Field of Classification Search
CPC .. H01R 13/631; H01R 4/48185; H01R 24/68; H01R 2107/00; H01R 12/82
See application file for complete search history.

(56) References Cited

U.S. PATENT DOCUMENTS 6,524,117 B1 * 2/2003 Murakami .......... H01R 13/193 439/74
7,267,583 B1 * 9/2007 Smith ................. H01R 13/193 439/924.1

(Continued)

FOREIGN PATENT DOCUMENTS

DE 19838492 A1 3/2000
DE 102004061276 A1 6/2006

(Continued)

*Primary Examiner* — Abdullah A Riyami
*Assistant Examiner* — Nader J Alhawamdeh
(74) *Attorney, Agent, or Firm* — LEYDIG, VOIT & MAYER, LTD.

(57) ABSTRACT

A plug system includes a plug connector part, which has a plug connector housing and a multiplicity of connection terminals, which are arranged on the plug connector housing and which each have a spring element forming a clamping leg, and a plug device, which has a multiplicity of electrically conductive plug elements. The plug elements of the plug device for electrically contacting the connection terminals of the plug connector part can each be connected in a plugging manner along a plugging direction to one of the connection terminals of the plug connector part and, in a connected position, are mechanically operatively connected to the clamping leg of the spring element of the respective connection terminal. At least some of the plug elements have a different height measured along the plugging direction.

10 Claims, 7 Drawing Sheets

(56) References Cited

U.S. PATENT DOCUMENTS

| | | | | |
|---|---|---|---|---|
| 9,343,827 | B2 * | 5/2016 | Hoppmann | H01R 4/48 |
| 9,543,666 | B2 * | 1/2017 | Wendt | H01R 4/5008 |
| 10,062,976 | B2 * | 8/2018 | Hoppe | H01R 13/66 |
| 10,283,880 | B2 * | 5/2019 | Kettern | H01R 4/40 |
| 2014/0375118 | A1 | 12/2014 | Namuduri | |
| 2018/0226732 | A1 * | 8/2018 | Stjepanovic | H01R 9/2416 |
| 2022/0059968 | A1 * | 2/2022 | Wille | H01R 12/82 |

FOREIGN PATENT DOCUMENTS

| | | | |
|---|---|---|---|
| DE | 102009008933 | A1 | 8/2010 |
| DE | 102014105106 | A1 | 12/2014 |
| GB | 2342236 | A | 4/2000 |

* cited by examiner

A - A

C - C

PLUG SYSTEM COMPRISING A PLUG CONNECTOR PART AND A PLUG DEVICE

CROSS-REFERENCE TO PRIOR APPLICATIONS

This application is a U.S. National Phase application under 35 U.S.C. § 371 of International Application No. PCT/EP2020/055844, filed on Mar. 5, 2020, and claims benefit to German Patent Application No. DE 10 2019 106 254.3, filed on Mar. 12, 2019. The International Application was published in German on Sep. 17, 2020 as WO 2020/182608 under PCT Article 21(2).

FIELD

The invention relates to a plug system comprising a plug connector part and a plug device.

BACKGROUND

A plug system may include a plug connector part, which has a plug connector housing and a multiplicity of connection terminals, which are arranged on the plug connector housing and which each have a spring element forming a clamping leg. The plug system may also include a plug device having a multiplicity of electrically conductive plug elements. For electrically contacting the connection terminals of the plug connector part, the plug elements of the plug device can each be connected in a plugging manner along a plugging direction to one of the connection terminals of the plug connector part and, in a connected position, are operatively connected mechanically to the clamping leg of the spring element of the respective connection terminal.

A connection terminal with a spring element is known, for example, from DE 10 2009 008 933 A1. In the case of this connection terminal, a spring element and a contact element are arranged in a contact housing. A line can be plugged into a conductor insertion opening of an actuating element, wherein during plugging-in, the actuating element is pressed into the connection terminal and the spring element is thereby adjusted with a leg relative to the contact element so that the line can be plugged between the contact element and the leg of the spring element.

Connection terminals using a spring element are also referred to as 'push-in' connection terminals. Such connection terminals are usually contacted with electrical lines in the form of individual conductors in order to connect the electrical lines to the plug connector part, wherein each connection terminal is usually connected to an associated individual conductor.

Such connection terminals enable direct plugging, in that an electrical line is plugged into a plug opening of a connection terminal, thereby acting on the clamping leg of the spring element and deflecting it in such a way that the electrical line is mechanically locked on the connection terminal in a connected position and is also electrically contacted with the connection terminal. If the electrical line is to be detached from the connection terminal again, the clamping leg can be deflected, for example, by actuating a suitable actuating element such that the electrical line can be removed from the connection terminal again.

The direct plugging of an electrical line onto a connection terminal of a plug connector part thus requires a plugging force that is sufficient to elastically deflect the clamping leg of the spring element. If electrical lines combined with one another on a plug device are to be jointly connected to the connection terminals of a plug connector part, the electrical lines will interact simultaneously with the clamping legs of the spring elements so as to elastically deflect the clamping legs. The resulting total plugging force required for connecting the plug device to the plug connector part thus corresponds to the sum of the individual plugging forces required for connecting the electrical lines to the connection terminals. The total plugging force, in particular, at the beginning of the plugging process, can thus be great.

DE 10 2004 061 276 A1 discloses a contact arrangement having a first contact piece and a second contact piece, in which contact elements on the first contact piece are cyclically offset from one another.

DE 198 38 492 A1 discloses a plug connector in which contact pins are of different lengths.

SUMMARY

In an embodiment, the present invention provides plug system comprising a plug connector part, which has a plug connector housing and a multiplicity of connection terminals, which are arranged on the plug connector housing and which each have a spring element forming a clamping leg, and a plug device, which has a multiplicity of electrically conductive plug elements. The plug elements of the plug device for electrically contacting the connection terminals of the plug connector part can each be connected in a plugging manner along a plugging direction to one of the connection terminals of the plug connector part and, in a connected position, are mechanically operatively connected to the clamping leg of the spring element of the respective connection terminal. At least some of the plug elements have a different height as measured along the plugging direction.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

and

Figure 11:
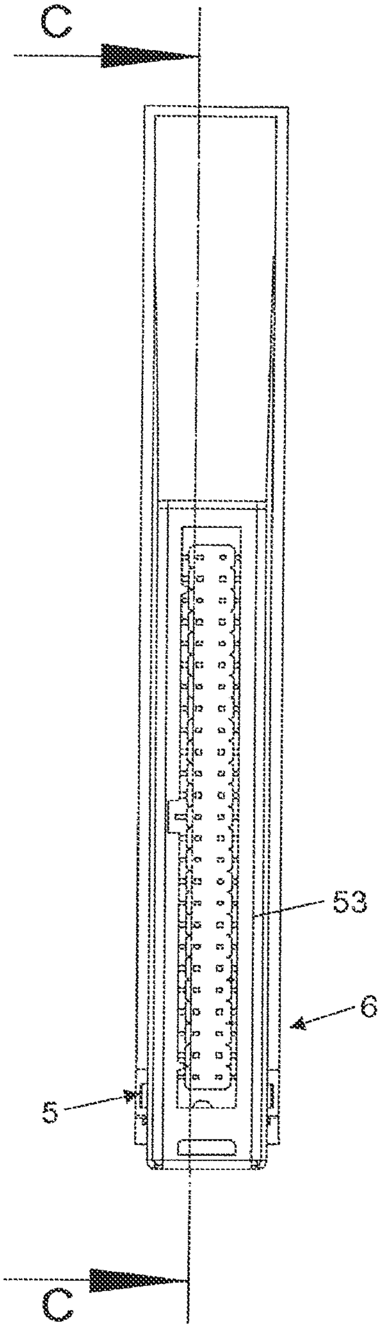
FIG. 11 is a top view of the plug connector part when the plug device is attached.
Figure 12:
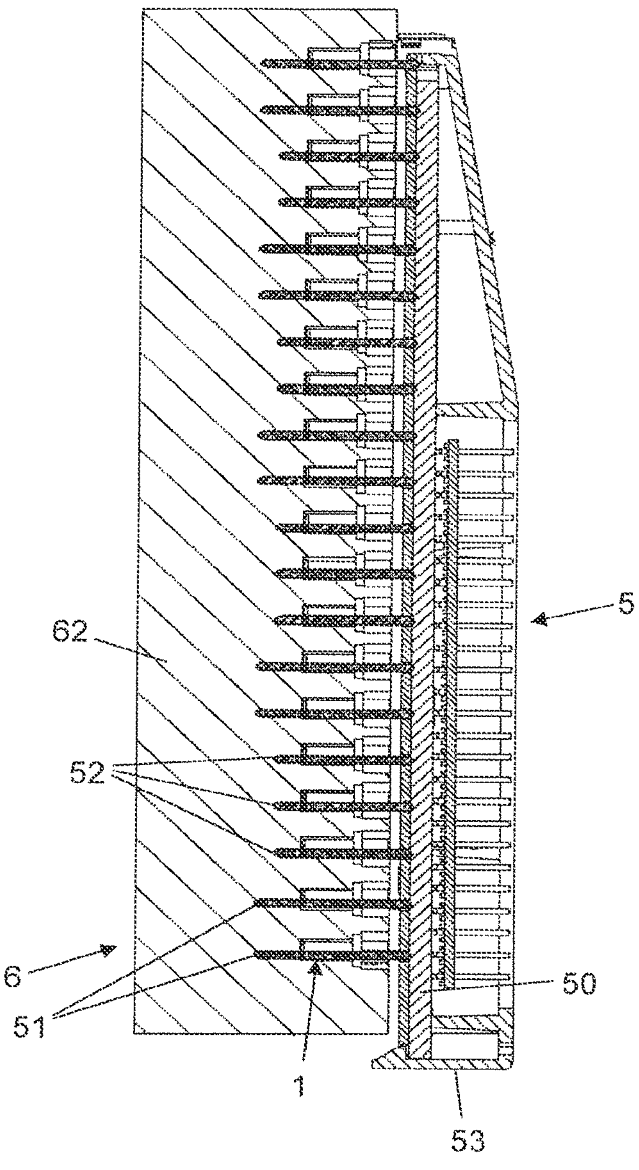

FIG. 12 is a sectional view along line C-C according to FIG. 11.

DETAILED DESCRIPTION

Embodiments of the present invention provide a plug system that makes it possible in a simple manner to reduce the required plugging force for connecting a plug device comprising a multiplicity of plug elements to a plug connector part comprising a multiplicity of connection terminals.

The plug system comprises a plug connector part, which has a multiplicity of connection terminals, which are arranged on a plug connector housing and which each have a spring element forming a clamping leg. A plug device that has a multiplicity of electrically conductive plug elements, for example in the form of pins, can be attached in a plugging manner to the plug connector part. In this case, each plug element can be attached to one of the connection terminals so that when the plug elements are connected in a plugging manner to the connection terminals, the plug elements act on the clamping leg of the spring element of the respective connection terminal and elastically deflect the clamping leg in such a way that, in a connected position, the plug elements of the plug device are mechanically locked on the connection terminals and are also electrically contacted with the connection terminals.

Since the plug elements have different heights, in each case measured along the plugging direction, it is achieved that the plug elements interact in stages with the connection terminals, in particular, with the clamping legs of the spring elements of the connection terminals, when the plug device with the plug elements is attached to the plug connector part with the connection terminals arranged thereon. Longer plug elements thus interact earlier with the connection terminals associated therewith, in particular, the clamping legs of the spring elements of the connection terminals, while shorter plug elements only connect subsequently to the connection terminals associated therewith. Since the plug elements are of different lengths, the plugging force required overall can thus be reduced because a plugging force required for connecting the plug elements to the respective connection terminals is to be applied in a staggered manner.

Since the plug elements have different heights measured along the plugging direction, some plug elements interact first with associated spring elements of connection terminals when other plug elements are already at least partially plugged, so that the plugging forces are distributed in a staggered manner. Each plug element basically requires a particular plugging force in order to contact an associated spring element. At the beginning of a plugging process, a reduced plugging force is needed because initially only the plug elements of great height enter the associated connection terminals and contact the spring elements of the connection terminals. If there are two equal-sized groups of plug elements of two discrete heights present, the plugging force will be halved at the beginning of the plugging process provided only the plug elements of great height make contact.

The plug elements can be divided into groups that have discrete heights. A first group of plug elements may thus have a first height, while a second group of plug elements has a second height that is less than the first height. First plug elements thus have a first height that is greater than a second height of second plug elements. Plug elements of two different, discrete heights are thus present, wherein the number of plug elements in the first group and the number of plug elements in the second group can be the same or different.

Alternatively, it is also conceivable for the height of the plug elements to vary to a greater extent and for more than two discrete heights to be present. For example, the height of the plug elements can vary on the basis of a cyclic function, for example on the basis of a sine function, or three or more groups of plug elements each having a discrete height associated with the group can be present.

In one embodiment, the plug device has a circuit board, which extends planarly along a plane extending perpendicularly to the plugging direction and on which the plug elements are arranged in such a way that the plug elements project from the circuit board along the plugging direction. The circuit board thus extends planarly along a plane spanned by a longitudinal direction and a transverse direction, wherein the longitudinal direction and the transverse direction are each directed perpendicularly to the plugging direction. The electrically conductive plug elements are rigidly arranged on the circuit board and are thus combined with one another via the circuit board in such a way that the plug elements can be jointly attached to the connection terminals of the plug connector part. Conductor tracks for electrically connecting the plug elements to one another and/or to associated further electrical or electronic assemblies can, for example, be formed on the circuit board. Electrical lines can be connected to the circuit board so that a plurality of electrical lines can jointly be contacted to the connection terminals of the plug connector part via the plug device.

In one embodiment, at least some of the plug elements are lined up next to one another along a longitudinal direction extending transversely to the plugging direction. Plug elements thus form a row, which can be formed, for example, on the circuit board and within the framework of which plug elements can be lined up next to one another and spaced apart equally. Such a row of plug elements can advantageously be connected in a plugging manner to a row of connection terminals arranged on the plug connector part, in order to electrically contact the plug elements with the connection terminals and mechanically connect them to the connection terminals.

In one development, the plug device has several rows of plug elements, wherein the rows are spaced apart from one another along a transverse direction directed transversely to the longitudinal direction. In this case, each row can have, for example, an equal number of plug elements, wherein the plug elements of each row can be arranged and spaced apart equally from one another and an arrangement of plug elements is thus created in the manner of a matrix. In this way, for example, a plug device can be created having two or more rows of plug elements, which are combined with one another on a circuit board and can thus jointly be attached to an associated arrangement of connection terminals of the plug connector part, namely several rows of connection terminals on the plug connector part.

The heights of the plug elements can vary along each row and, additionally or alternatively, along the transverse direction between the rows. In one embodiment, it is conceivable, for example, for the plug elements to vary in height along each row, wherein adjacent plug elements of different rows, however, have the same height. Accordingly, plug elements of the rows of plug elements that are arranged at the same positions when viewed along the longitudinal direction have the same height so that variation in height is provided exclusively along the longitudinal direction. Alternatively, however, plug elements that are arranged at the same axial position may also have different heights.

In one development, the spring elements of the connection terminals are arranged at the same height when viewed along the plugging direction. In the connected position, the clamping connection via the clamping legs of the connection terminals thus takes place at a uniform clamping height. While the height of the plug elements measured along the plugging direction thus varies, the connection terminals are functionally arranged at the same height and establish a mechanical connection and electrical contact with the different plug elements at a common, uniform height.

In one development, the connection terminals can all be of the same design, with identically designed spring elements. The connection terminals thus do not differ from one another and are arranged at the same height on the plug connector housing of the plug connector part.

In one development, each connection terminal has a contact housing that forms a support section on which the spring element is arranged. The contact housing of each connection terminal may in this case be of modular design so that the connection terminals may be arranged on the plug connector housing and accommodated in the plug connector housing in a modular manner. Alternatively, the contact housing of each connection terminal is formed integrally and in one piece with the plug connector housing of the plug connector part so that the connection terminals with their contact housings are integrated in the plug connector housing.

In one embodiment, the spring element of each connection terminal has a curved bearing section and a support leg, wherein the support leg is formed on a first side of the bearing section and supported on the contact housing, while the clamping leg is formed on a second side of the bearing section and can be elastically deflected in relation to the support leg when the plug elements are connected in a plugging manner to the connection terminals. The support leg serves to support the spring element in relation to the housing, wherein the spring element with the bearing section extends across the support section of the contact housing and thereby provides a defined pivot point for the clamping leg in relation to the support leg. During connecting in a plugging manner, the spring element interacts with an associated plug element of the plug device via the clamping leg so that, during connecting in a plugging manner, the clamping leg is elastically deflected and thereby interacts with the plug element, and the plug element is thus mechanically locked and electrically contacted.

In one development, each connection terminal has an electrical contact element for electrical contact with a respectively plugged-in plug element of the plug device. Such an electrical contact element can be designed as a bus bar and extend into the region of the contact housing of the connection terminal in such a way that, in the connected position, a plugged-in plug element is pressed via the clamping leg of the respective spring element into electrical contact with the contact element.

The plug connector part can be connected to a higher-level electrical assembly, for example, iby the plug connector part being fixedly connected to a circuit board or a switchgear cabinet wall or the like. In this case, electrical lines that are electrically connected to the plug elements can, for example, be connected to the plug connector part via the plug device.

In an alternative development, the plug connector part can be designed for plugging connection to an associated mating plug connector part. For example, at an end facing away from plug openings for attaching the plug elements to the connection terminals of the plug connector part, a plug section can be formed, for example, in the region of which connection elements of the contact elements of the connection terminals are arranged so that a plug face for plugging connection to an associated mating plug connector part is provided on the plug section. The connection elements of the contact elements can be designed, for example, as contact pins or contact sockets so that the connection elements can be connected in a plugging manner to suitable associated mating contact elements of the mating plug connector part.

Figure 1:
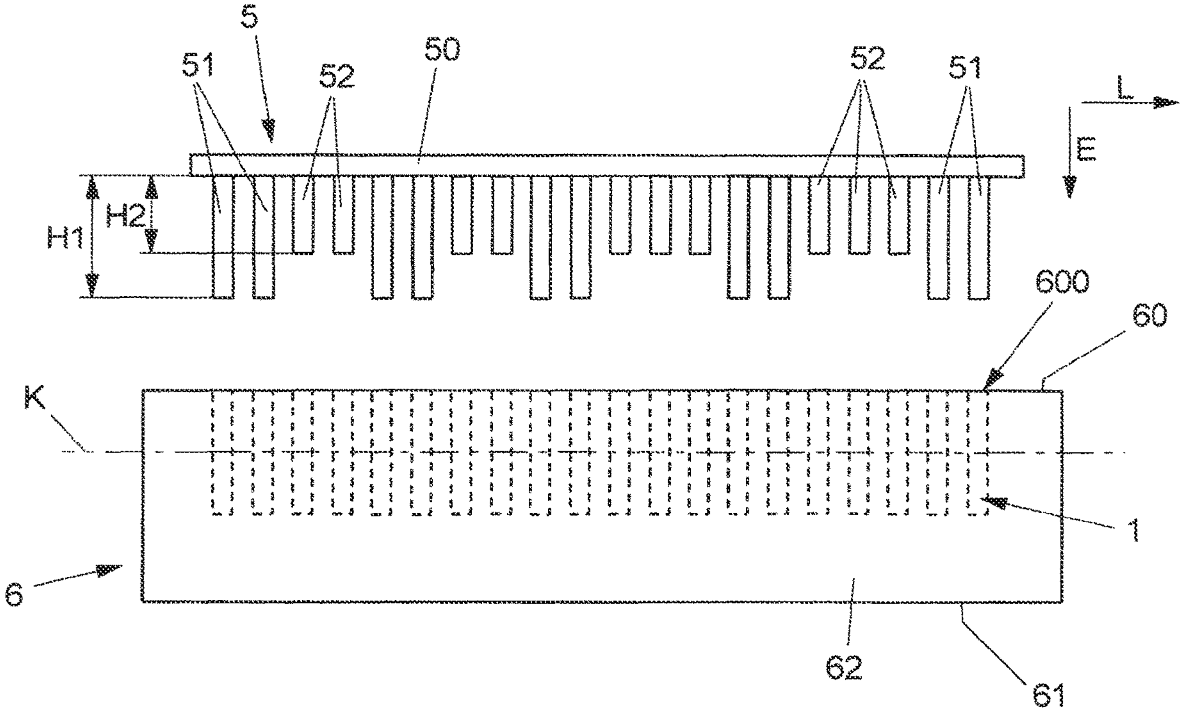
FIG. 1 is a schematic view of a plug system with a plug connector part and a plug device to be connected in a plugging manner to the plug connector part.

FIG. 1 shows a schematic view of a plug system, which has a plug connector part 6 with a plug connector housing 62 and a plurality of connection terminals 1 in the form of spring-force connections, which are accommodated in the plug connector housing 62 and are lined up next to one another along a longitudinal direction L.

A plug device 5 can be attached to the plug connector part 6 along a plugging direction E in that plug elements 51, 52 arranged on a circuit board 50 are plugged into plug openings 600 formed on a first, upper side 60 of the plug connector housing 62 and are thereby operatively connected to the connection terminals 1. In a connected position, each plug element 51, 52 is inserted in an associated plug opening 600, is locked mechanically to the plug connector part 6 via a connection terminal 1 and is also electrically contacted with the connection terminal 1.

Figure 2:
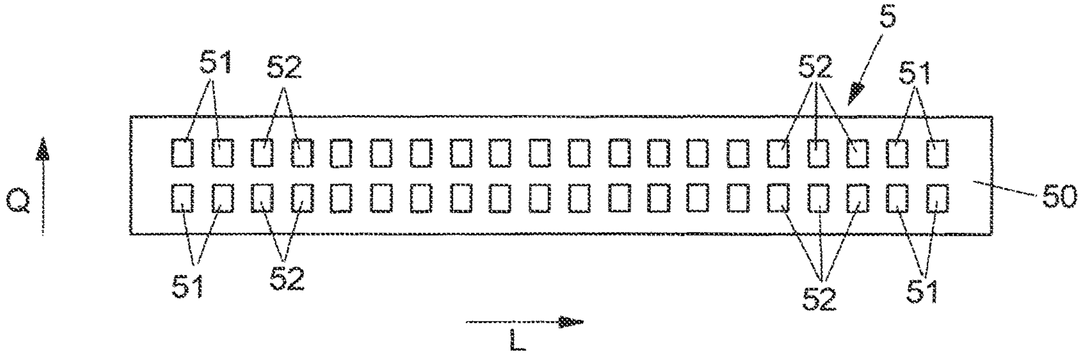
FIG. 2 is a schematic top view of the plug device.

In the exemplary embodiment shown schematically in FIGS. 1 and 2, the plug elements 51, 52 take the form of electrical contact pins projecting from the circuit board 50 along the plugging direction E. In this case, the circuit board 50 extends planarly along a plane that extends perpendicularly to the plugging direction E and is spanned by a longitudinal direction L and a transverse direction Q (corresponding to the drawing plane according to FIG. 2). The plug elements 51, 52 are fixedly connected to one another via the circuit board 50 and are thus combined with one another to form a uniformly manageable assembly so that the plug elements 51, 52 can jointly be attached to the plug connector part 6.

As shown in FIG. 2, in the exemplary embodiment shown, the plug device 5 has several rows of plug elements 51, 52—two rows of plug elements 51, 52 in the specific exemplary embodiment—wherein each row comprises a multiplicity of plug elements 51, 52, which are lined up next to one another along the longitudinal direction L and equally spaced apart from one another, and the rows are spaced apart from one another along the transverse direction Q directed transversely to the longitudinal direction L. In this case, the rows each have the same number of plug elements 51, 52. Since the plug elements 51, 52 are equally spaced apart from one another along the longitudinal direction L, a regular arrangement of plug elements 51, 52 is thus created in the manner of a matrix, which can be plugged into an associated, complementary arrangement of connection terminals 1 on the plug connector part 6.

Figure 3:
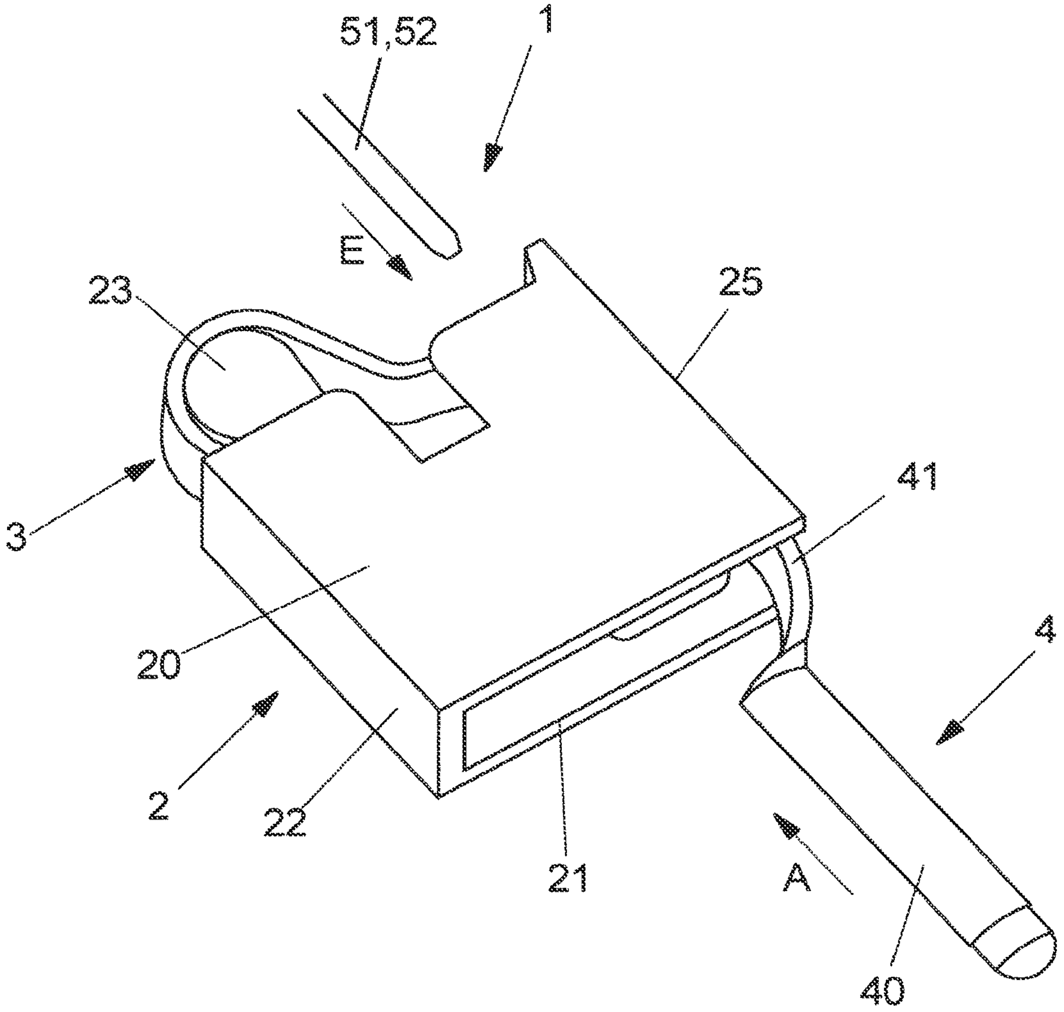
FIG. 3 is a separate view of an exemplary embodiment of a connection terminal of a plug connector part, with a contact housing, a spring element, and a contact element.

FIG. 3 shows a perspective view of an exemplary embodiment of a single connection terminal 1, which has a contact housing 2 and a spring element 3 arranged on the contact housing 2. As in the exemplary embodiment shown, a contact element 4 can be attached to the contact housing 2 in such a way that the contact element 4 projects with a connection element in the form of a contact pin 40 or a contact tulip or the like from the contact housing 2 and engages with a contact arm 41 in the contact housing 2.

A plug element 51, 52 of the plug device 5 can be plugged into each connection terminal 1 in the plugging direction E so that, in a position in which the respective plug element 51, 52 is attached to the connection terminal 1, the plug element 51, 52 is held on the contact housing 2 via the spring element 3 and is electrically contacted to the contact arm 41 of the contact element 4.

The contact element 4 is plugged into the contact housing 2 in an attachment direction A opposite the plugging direction E. The connection terminal 1 is arranged on the plug connector housing 62 of the plug connector part 6, wherein the contact housing 2 may be of modular design and inserted into the plug connector housing 62 or, alternatively, may be formed integrally with the plug connector housing 62.

Figure 4A:
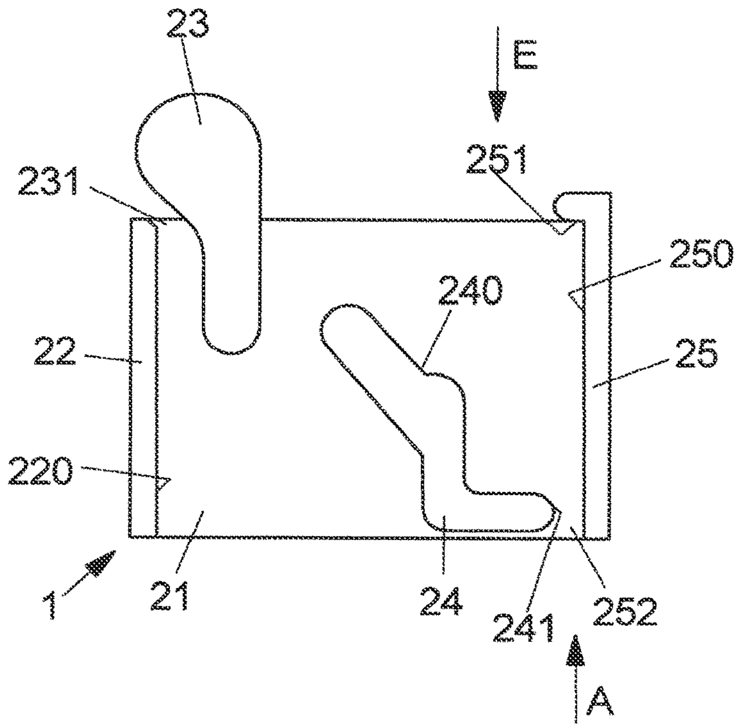
FIG. 4A is a view of the contact housing without a top wall.
Figure 4B:
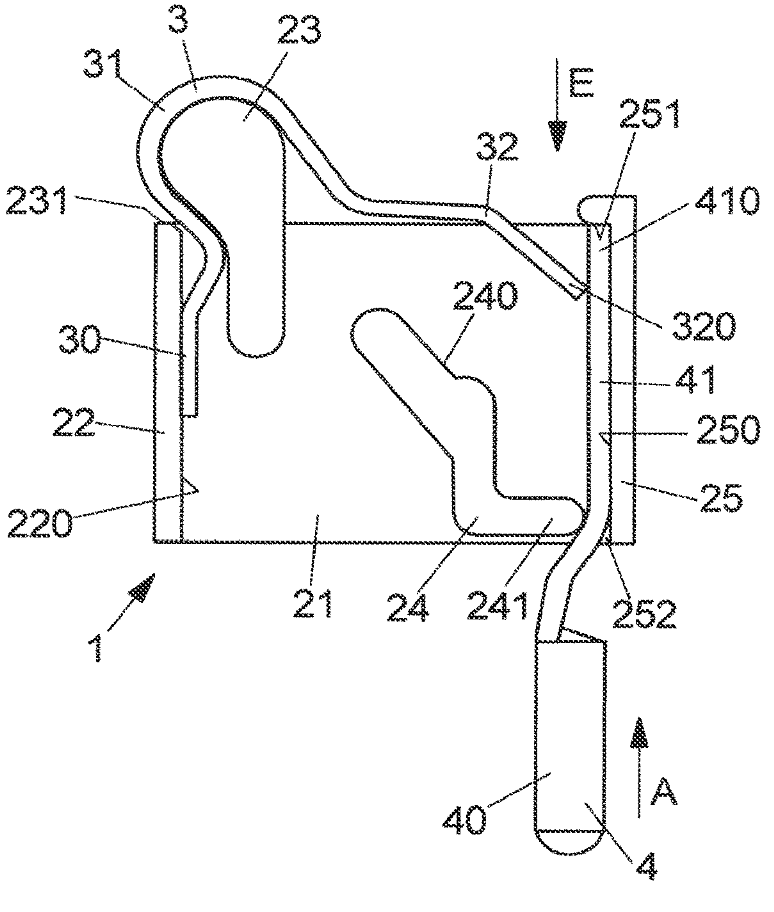
FIG. 4B is the view according to FIG. 4A, with a spring element arranged on the contact housing and a contact element arranged on the contact housing.
Figure 5:
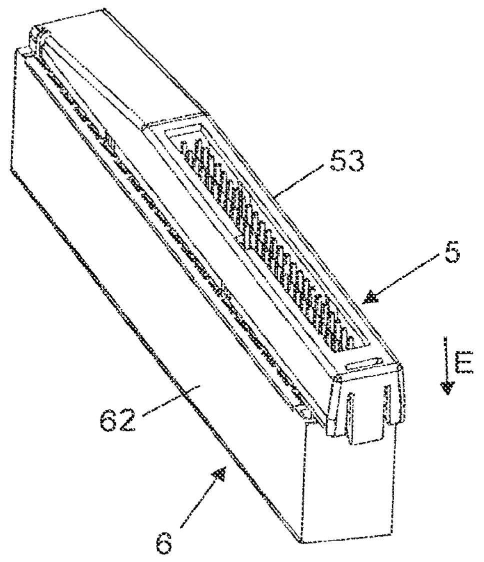
FIG. 5 is a view of an exemplary embodiment of a plug connector part with a plug device attached thereto.

FIGS. 4A and 4B show the contact housing 2 in a separate view (FIG. 4A) and in a view with the spring element 3 and the contact element 4 arranged thereon (FIG. 4B). The contact housing 2 has two cover walls 20, 21, which are connected to one another via side walls 22, 25 (see FIG. 3). FIGS. 4A and 4B show the contact housing 2 without the cover wall 20 (according to the illustration in FIG. 3, the upper cover wall) and thus offer an unimpeded view of the elements 23, 24 arranged within the contact housing 2.

The contact housing 2 has a support section 23 around which the spring element 3 is laid with a bearing section 31 so that the spring element 3 extends, with a support leg 30 formed by a first spring leg and a clamping leg 32 formed by a second spring leg, from the support section 23. The support leg 30 extends in this case through an opening 231 between the support section 23 and a first side wall 22 of the contact housing 2 and is supported via the support leg 30 on an inner face 220 of the side wall 22. In contrast, the clamping leg 32 extends from the support section 23 with one end 320 in the direction of a second side wall 25. The contact housing 2 also has a stop section 24 with a stop face 240, which provides a stop for the clamping leg 32.

In principle, however, the connection element 1 may also have a different design, for example with a differently designed spring element or contact housing.

If a plug element 51, 52 is inserted into the contact housing 2 in the plugging direction E, the clamping leg 32 will be pivoted with elastic deformation in relation to the support section 23 and thus be removed with its end 320 from the contact arm 41 of the contact element 4. The support section 23 thus represents a pivot point for the clamping leg 32, while the support leg 30 serves as an abutment for the pivoting of the clamping leg 32.

If the plug element 51, 52 is plugged with one end into the contact housing 2, the plug element 51, 52 will be pressed against the contact arm 41 of the contact element 4 by the clamping leg 32 so that the plug element 51, 52 is electrically contacted with the contact element 4 and is also mechanically locked on the connection terminal 1. Due to the elastic deformation of the clamping leg 32, the plug element 51, 52 is held via the end 320 with elastic pretension on the contact arm 41 of the contact element 4.

FIGS. 5 to 12 show an exemplary embodiment of a plug system comprising a plug connector part 6 and a plug device 5 attached thereto. In this case, components with the same function are denoted by the same reference signs as above.

The plug connector part 6 has a plug connector housing 62 with an upper side 60 and an underside 61. Plug openings 600, into which the plug device 5 with plug elements 51, 52 is to be plugged along a plugging direction E, are formed on the upper side 60 in order to establish an electrical contact with connection terminals 1 enclosed in the plug connector housing 62.

The connection terminals 1 of the plug connector part 6 can be designed, for example, as described above with reference to the exemplary embodiment according to FIG. 3 and FIGS. 4A, 4B.

Figure 6A:
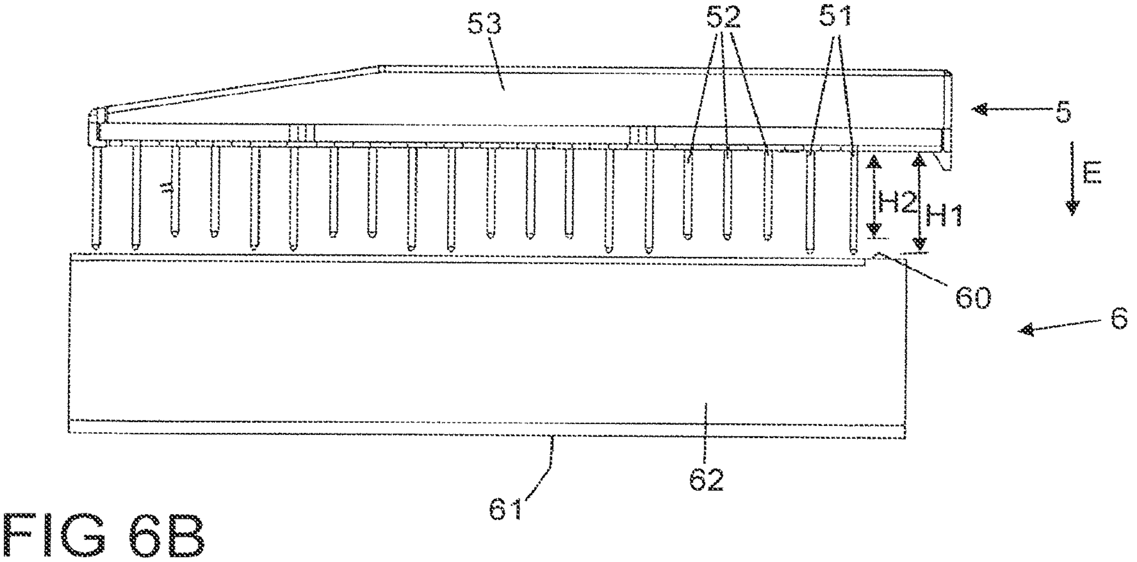
FIG. 6A is a side view of the plug connector part together with the plug device before attachment of the plug device to the plug connector part.
Figure 6B:
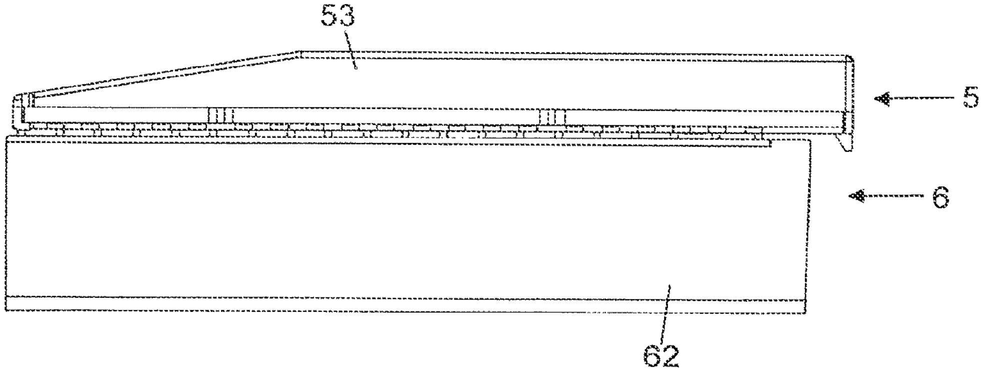
FIG. 6B is a view of the plug connector part together with the plug device, in the attached position.
Figure 7:
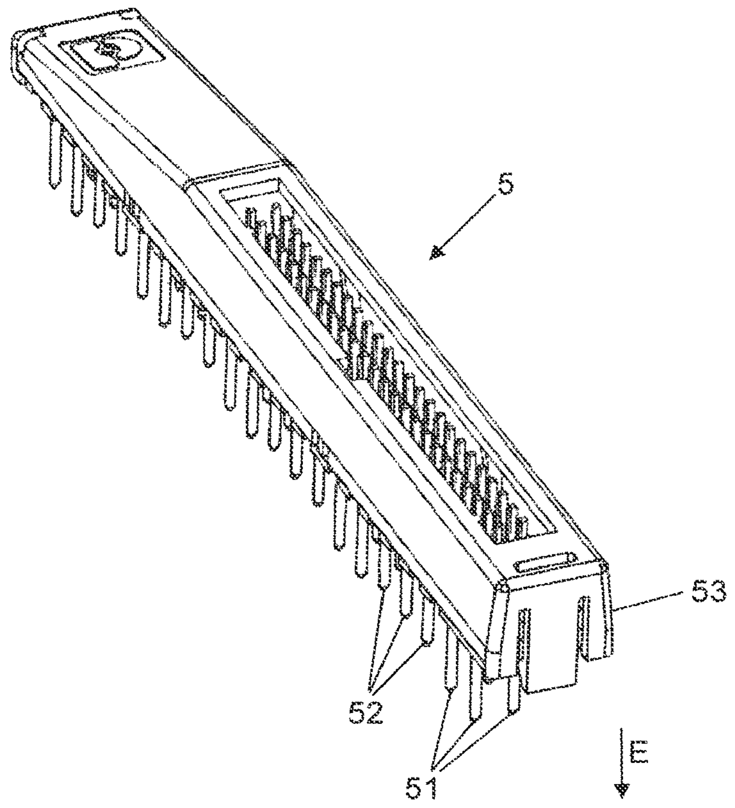
FIG. 7 is a separate view of the plug device.
Figure 8:
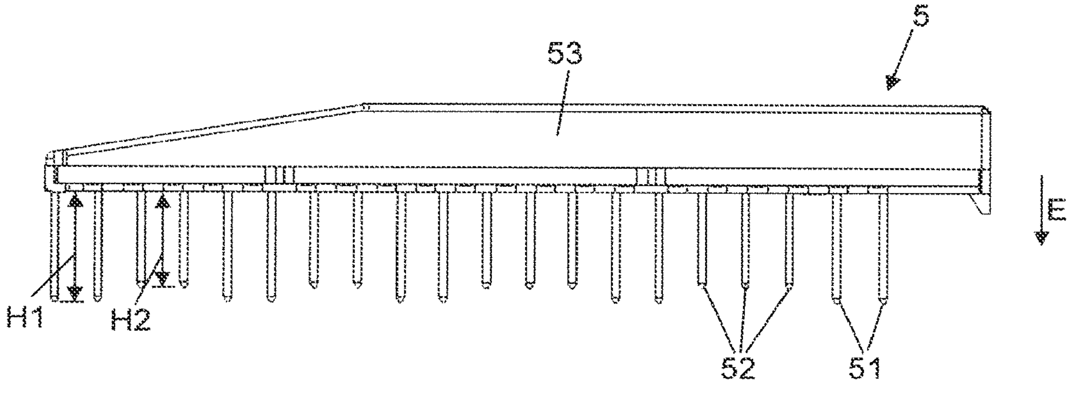
FIG. 8 is a side view of the plug device.
Figure 9:
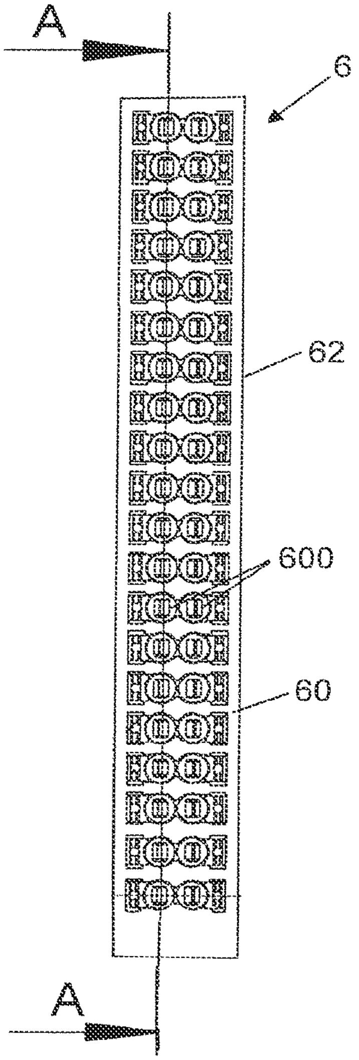
FIG. 9 is a top view of the plug connector part.

In the exemplary embodiment shown in FIGS. 5 to 12, the plug device 5 has a housing 53, in which a circuit board 50 with plug elements 51, 52 arranged thereon is enclosed in such a way that the plug elements 51, 52 project from the housing 53 on a side with which the plug device 5 is to be attached to the plug connector part 6, as shown, for example, in FIGS. 6A, 7, and 8.

On the upper side 60 of the plug connector housing 62, the plug connector part 6 has an arrangement of plug openings 600, each associated with a connection terminal 1. The arrangement of the plug openings 600 with the associated connection terminals 1 corresponds in this case to the arrangement of the plug elements 51, 52 on the plug device 5 so that the plug device 5 can be brought into a plugging connection with the plug connector part 6 along the plugging direction E.

The plug connector part 6 with the plug connector housing 62 and the connection terminals 1 arranged thereon can, for example, be a component of a plug connector assembly in which the plug connector part 6 can be arranged, for example, via the underside 61 on a support rail and can thus be combined with other electrical or electronic devices. In general, the plug connector part 6 can be connected to a superordinate electrical or electronic assembly in order to provide electrical or electronic functions within the framework of such an assembly.

In order to connect a plug device 5 to an associated plug connector part 6, the plug device 5 with its plug elements 51, 52 is attached to the plug connector part 6 in the plugging direction E so that the plug elements 51, 52 engage with the plug openings 600 on the upper side of the plug connector housing 62 and electrically contact the connection terminals 1 of the plug connector part 6 (see the transition from FIG. 6A to FIG. 6B). Since the plug elements 51, 52 act on the spring elements 3 when connecting in a plugging manner, in order to elastically deflect the clamping legs 32 of the spring elements 3 and to thereby establish an electrical connection and additionally mechanical locking, plugging forces are required for the plugging connection of the plug elements 51, 52 and add up for the entirety of the connection terminals 1.

Figure 10:
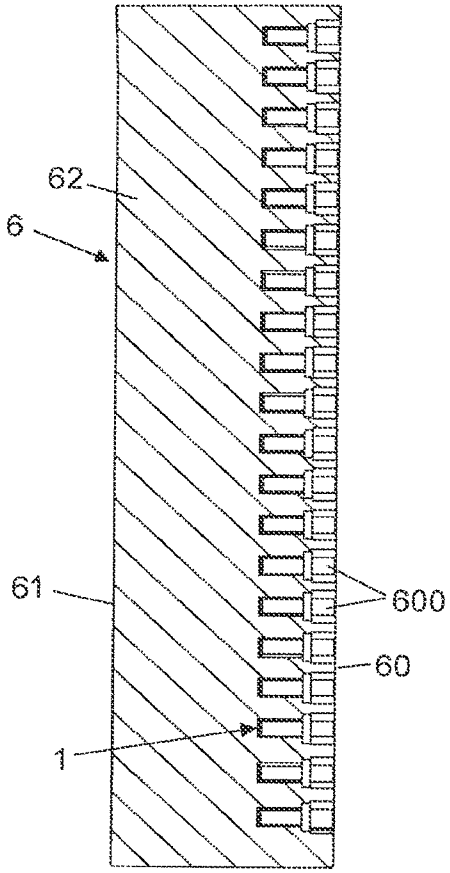
FIG. 10 is a sectional view along line A-A according to FIG. 9.

In order to reduce the required plugging force at the beginning of a plugging process, in the exemplary embodiments shown in FIG. 1 and FIGS. 5 to 12, the plug elements 51, 52 of the plug device 5 are formed with different heights H1, H2, measured along the plugging direction E and starting from the circuit board 50. Since, as shown in FIG. 10, the connection terminals 1 of the plug connector part 6 are accommodated at the same height in the plug connector housing 62 and the spring elements 3 of the connection terminals 1 are thus arranged at the same height on the plug connector part 6, the different heights H1, H2 of the plug elements 51, 52 cause the plug elements 51, 52 to interact in a staggered manner with the clamping legs 32 of the spring elements 3 of the connection terminals 1, and the plugging process between the plug elements 51, 52 and the connection terminals 1 to thus proceeds in a staggered manner.

In the exemplary embodiments shown in FIG. 1 and FIGS. 5 to 12, the plug device 5 has two groups of plug elements 51, 52, which have different heights H1, H2. A first group of plug elements 51 thus has a first height H1, while a second group of plug elements 52 is formed with a second height H2 that is less than the first height H1. When connecting in a plugging manner, the plug elements 51 of the first group thus first come into operative connection with connection terminals 1 of the plug connector part 6. As plugging-in continues, the plug elements 52 of the second group do not come into operative connection with connection terminals 1 until the plug elements 51 of the first group are already at least partially plugged into the connection terminals 1 associated therewith.

In the exemplary embodiment shown schematically in FIGS. 1 and 2, as well as in the exemplary embodiment according to FIGS. 5 to 12, the plug device 5 has a total of 40 plug elements 51, 52, wherein this is by no means limiting for the present invention and any other number of plug elements 51, 52, for example also significantly fewer or significantly more plug elements 51, 52, may also be present. In the exemplary embodiments shown, equal numbers of plug elements 51 of the first height H1 and of plug elements 52 of the second height H2 are provided. The height H1, H2 varies along each row of plug elements 51, 52, wherein the height H1, H2 of plug elements 51, 52 adjacent in the transverse direction Q is, however, the same.

Instead of two discrete heights H1, H2, the plug elements 51, 52 can also vary in height to a greater extent. In particular, more than two discrete heights H1, H2 of plug elements 51, 52 may be present.

The plug connector part 6 has an arrangement of connection terminals 1 corresponding to the arrangement of the plug elements 51, 52 (wherein more connection terminals 1 than plug elements 51, 52 may also be present) so that the plug device 5 with the plug elements 51, 52 can be attached to the connection terminals 1 of the plug connector part 6.

Since the connection terminals 1 are accommodated at the same height in the plug connector housing 62, a clamping connection between the clamping legs 32 and the plug elements 51, 52 is established at least approximately at a uniform clamping height K via the clamping legs 32 of the spring elements 3 of the connection terminals 1, independently of the height H1, H2 of the plug elements 51, 52. In the plugged-in position, the plug elements 51, 52 are thus functionally identical in their electrical contacting and mechanical locking.

The idea underlying the invention is not limited to the exemplary embodiments described above but can in principle also be implemented in a completely different manner.

In particular, the plug connector part does not necessarily have to be designed for plugging connection to an associated mating plug connector part but may also be a component of a higher-level assembly. For example, the plug connector part can be connected to a circuit board or to a switchgear cabinet wall.

A plug device can in principle have any desired number of plug elements. At least some of the plug elements vary in height, wherein the connection terminals of the plug connector part are preferably of the same design and the plug device may optionally also be connected to the plug connector part in different positions, in particular, if more connection terminals than plug elements are present.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Connection terminal
2 Contact housing
20, 21 Wall
22 Side wall
220 Inner face
23 Support section
231 Opening
24 Stop section
240 Stop face
241 End
25 Side wall
250 Inner face
251 Stop
252 Opening
3 Spring element
30 Support leg
31 Bearing section
32 Clamping leg
320 End
4 Contact element
40 Connection element (contact pin)
41 Contact arm
410 End
5 Plug device
50 Circuit board
51, 52 Plug element
53 Housing
6 Plug connector part
60 Upper side
600 Plug-in openings
61 Underside
62 Plug connector housing
A Attachment direction
E Plugging direction
H1, H2 Height
K Clamping height
L Longitudinal direction
Q Transverse direction

The invention claimed is:

1. A plug system, comprising:

a plug connector part, which has a plug connector housing and a multiplicity of connection terminals, which are arranged on the plug connector housing and which each have a spring element forming a clamping leg; and a plug device, which has a multiplicity of electrically conductive plug elements, wherein the plug elements of the plug device for electrically contacting the connection terminals of the plug connector part can each be connected in a plugging manner along a plugging direction to one of the connection terminals of the plug connector part and, in a connected position, are mechanically operatively connected to the clamping leg of the spring element of the respective connection terminal, wherein at least some of the plug elements have a different height measured along the plugging direction, and wherein the plug device has a circuit board, which extends planarly along a plane extending perpendicularly to the plugging direction and on which the plug elements are arranged in such a way that the plug elements project from the circuit board along the plugging direction.

2. The plug system according to claim 1, wherein a first group of the plug elements has a first height and a second group of the plug elements has a second height that is less than the first height.

3. The plug system according to claim 1, wherein at least some of the plug elements are lined up next to one another along a longitudinal direction extending transversely to the plugging direction.

4. The plug system according to claim 3, wherein the plug elements form at least two rows of plug elements extending along the longitudinal direction and spaced apart from one another transversely to the longitudinal direction.

5. The plug system according to claim 4, wherein plug elements of the rows of plug elements that, when viewed along the longitudinal direction, are arranged at the same positions, have the same height.

6. The plug system according to claim 1, wherein the spring elements of the connection terminals, when viewed along the plugging direction, are arranged at the same height in order to mechanically interact with the plug elements at a uniform clamping height.

7. The plug system according to claim 1, wherein each connection terminal has a contact housing, which forms a support section on which the spring element is arranged.

8. The plug system according to claim 7, wherein the spring element has a curved bearing section and a support leg, wherein the support leg is arranged on a first side of the bearing section and is supported on the contact housing, and the clamping leg is arranged on a second side of the bearing section and can be elastically deflected in relation to the support leg when the plug elements are connected in a plugging manner to the connection terminals.

9. The plug system according to claim 1, wherein each connection terminal has an electrical contact element for electrically contacting a respectively plugged-in plug element of the plug device.

10. A plug system,. comprising:

a plug connector part, which has a plug connector housing and a multiplicity of connection terminals, which are arranged on the plug connector housing and which each have a spring element forming a clamping leg; and a plug device, which has a multiplicity of electrically conductive plug elements, wherein the plug elements of the plug device for electrically contacting the connection terminals of the plug connector part can each be connected in a plugging manner along a plugging direction to one of the connection terminals of the plug connector part and, in a connected position, are mechanically operatively connected to the clamping leg of the spring element of the respective connection terminal, wherein at least some of the plug elements have a different height measured along the plugging direction, wherein each connection terminal has a contact housing, which forms a support section on which the spring element is arranged, and wherein the spring element has a curved bearing section and a support leg, wherein the support leg is arranged on a first side of the bearing section and is supported on the contact housing, and the clamping leg is arranged on a second side of the bearing section and can be elastically deflected in relation to the support leg when the plug elements are connected in a plugging manner to the connection terminals.

* * * * *